United States Patent
Puvak

(10) Patent No.: US 10,314,236 B2
(45) Date of Patent: Jun. 11, 2019

(54) AGRICULTURAL GRAIN CLEANER

(71) Applicant: Deere & Company, Moline, IL (US)

(72) Inventor: Jared Puvak, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 18 days.

(21) Appl. No.: 15/617,260

(22) Filed: Jun. 8, 2017

(65) Prior Publication Data
US 2018/0352747 A1    Dec. 13, 2018

(51) Int. Cl.
| | | |
|---|---|---|
| *A01F 12/44* | (2006.01) | |
| *B07B 9/00* | (2006.01) | |
| *B07B 9/02* | (2006.01) | |
| *B07B 4/02* | (2006.01) | |
| *B07B 11/04* | (2006.01) | |
| *A01F 12/48* | (2006.01) | |

(52) U.S. Cl.
CPC .......... *A01F 12/442* (2013.01); *A01F 12/444* (2013.01); *A01F 12/48* (2013.01); *B07B 4/025* (2013.01); *B07B 9/00* (2013.01); *B07B 9/02* (2013.01); *B07B 11/04* (2013.01)

(58) Field of Classification Search
CPC . A01F 12/442; A01F 12/395; A01D 41/1252; B07B 9/00; B07B 9/02; B07B 4/025
USPC ......................................... 460/64, 65, 98, 99
See application file for complete search history.

(56) References Cited

U.S. PATENT DOCUMENTS

| | | | | |
|---|---|---|---|---|
| 126,117 | A * | 4/1872 | Wemple ................. | A01F 11/00 460/64 |
| 541,769 | A * | 6/1895 | Macomber .............. | B07B 4/025 209/148 |
| 1,884,152 | A * | 10/1932 | Nye ........................ | A01F 12/00 209/143 |
| 2,334,946 | A * | 11/1943 | Mjolsness ............. | A01F 12/442 209/21 |

(Continued)

FOREIGN PATENT DOCUMENTS

| | | |
|---|---|---|
| DE | 1082763 B | 6/1960 |
| DE | 3324492 A1 | 1/1985 |

(Continued)

OTHER PUBLICATIONS

European Patent Office Search Report and Search Opinion for Application No. 18176555.3 dated Oct. 17, 2018 (8 pages).

*Primary Examiner* — Alicia Torres
(74) *Attorney, Agent, or Firm* — Michael Best & Friedrich LLP

(57) ABSTRACT

An agricultural grain cleaner includes an inlet chute having an inlet end and an outlet end positioned below the inlet end. A crop distribution member is positioned adjacent the outlet end of the inlet chute. The crop distribution member includes a distribution disc rotatable relative to the inlet chute about a vertical central axis to impart a horizontal trajectory, away from the central axis, to crop material supplied to the distribution disc from the inlet chute. A fan is operable to generate an air stream from below the crop distribution member, across the horizontal trajectory, to an air-chaff outlet. A grain collection chute has an inlet to receive grain that is cleaned of chaff by the air stream. A tailings collection chute is positioned adjacent to the grain collection chute on a radially inner side thereof.

18 Claims, 4 Drawing Sheets

(56) References Cited

U.S. PATENT DOCUMENTS

| | | | | |
|---|---|---|---|---|
| 2,880,734 | A | * | 4/1959 | Edstrom ................. B07B 4/025 |
| | | | | 209/303 |
| 2,905,182 | A | * | 9/1959 | Wise ........................ A01F 7/00 |
| | | | | 460/64 |
| 3,443,565 | A | * | 5/1969 | Jouveneaux .......... A01F 12/442 |
| | | | | 460/115 |
| 3,626,951 | A | | 12/1971 | Vogelenzang |
| 3,767,047 | A | * | 10/1973 | Rasmussen ............... B07B 1/26 |
| | | | | 209/22 |
| 3,808,780 | A | * | 5/1974 | Wood .................... A01F 12/442 |
| | | | | 209/291 |
| 4,198,802 | A | | 4/1980 | Hengen et al. |
| 4,236,530 | A | * | 12/1980 | Johnson ................. A01D 41/00 |
| | | | | 460/65 |
| 4,465,081 | A | | 4/1984 | Decoene et al. |
| 4,464,887 | A | | 8/1984 | Decoene et al. |
| 4,475,561 | A | | 10/1984 | Decoene et al. |
| 4,526,678 | A | * | 7/1985 | Myhren .................... B04C 9/00 |
| | | | | 209/139.2 |
| 4,904,224 | A | | 2/1990 | Pohjala |
| 4,917,652 | A | | 4/1990 | Glaubitz et al. |

FOREIGN PATENT DOCUMENTS

| | | | | | |
|---|---|---|---|---|---|
| EP | 0102117 | | | 3/1984 | |
| GB | 159326 | A | * | 2/1921 | ............... B07B 9/02 |
| GB | 184870 | A | | 8/1922 | |
| GB | 2135913 | A | * | 9/1984 | ............... B04C 9/00 |

* cited by examiner

AGRICULTURAL GRAIN CLEANER

BACKGROUND

The disclosure relates to grain cleaning devices used to separate useful grains of agricultural crops from other crop material following the threshing of grain from the crops. Grain cleaning devices are often integrated into combine harvesters, but can also be manufactured as standalone devices. Known grain cleaning devices include rotating or oscillating sieves, and may include a fan for blowing away material other than grain.

SUMMARY

The disclosure provides, in one aspect, an agricultural grain cleaner. An inlet chute of the grain cleaner has an inlet end and an outlet end positioned below the inlet end. A crop distribution member is positioned adjacent the outlet end of the inlet chute. The crop distribution member includes a distribution disc rotatable relative to the inlet chute about a vertical central axis to impart a horizontal trajectory, away from the central axis, to crop material supplied to the distribution disc from the inlet chute. A fan is operable to generate an air stream from below the crop distribution member, across the horizontal trajectory, to an air-chaff outlet. A grain collection chute has an inlet to receive grain that is cleaned of chaff by the air stream. A tailings collection chute is positioned adjacent to the grain collection chute on a radially inner side thereof.

The disclosure provides, in another aspect, an agricultural grain cleaner. An inlet chute of the grain cleaner has an inlet end and an outlet end. A crop distribution member includes a distribution disc positioned adjacent the outlet end of the inlet chute to receive crop material supplied through the inlet chute. The crop distribution member is rotatable about a central axis to propel the crop material airborne along a cleaning path in a direction away from the central axis. An air supply channel extends to direct an air stream toward the distribution disc and across the cleaning path. A grain collection chute has an inlet to receive grain that is cleaned of chaff by the air stream as it traverses the cleaning path. A tailings collection chute has an inlet positioned nearer the central axis than the inlet of the grain collection chute so that the tailings collection chute receives tailings that fall from the cleaning path.

The disclosure provides, in yet another aspect, a method of cleaning threshed grain in a grain cleaning device. Threshed crop material, including grain and chaff, is directed to a crop distribution member. The crop material is projected with the crop distribution member in an airborne trajectory along a cleaning path, and the crop distribution member projects the crop material at least predominantly horizontally. An air stream is provided transverse to the cleaning path. A grain collection chute is arranged to be horizontally spaced from the crop distribution member so that the grain projected from the crop distribution member lands in the grain collection chute, while the chaff is blown away from the grain trajectory so that the grain is cleaned of the chaff without sifting or sieving. One of a speed that the crop material is projected from the crop distribution member or a speed of the air stream is adjusted, independent of the other, to adjust grain cleaning performance.

Further aspects are set forth in the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
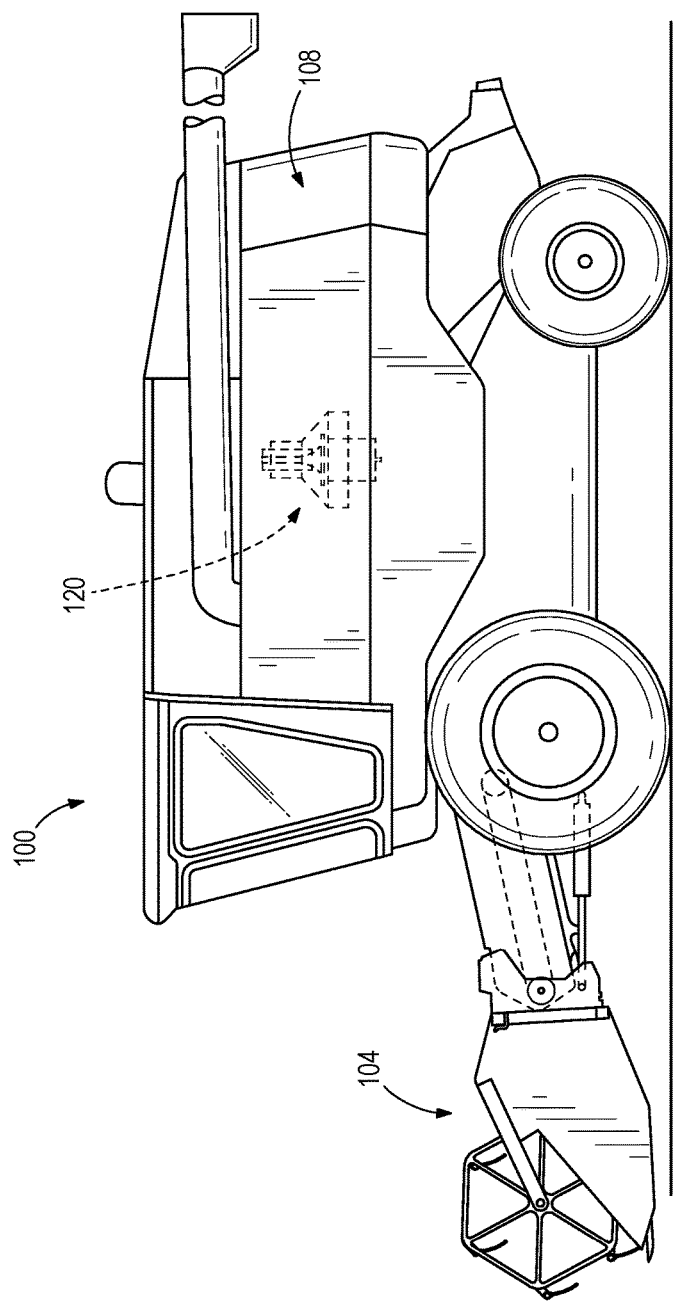
FIG. 1 is a combine harvester in which a grain cleaner of the present invention is provided.
Figure 2:
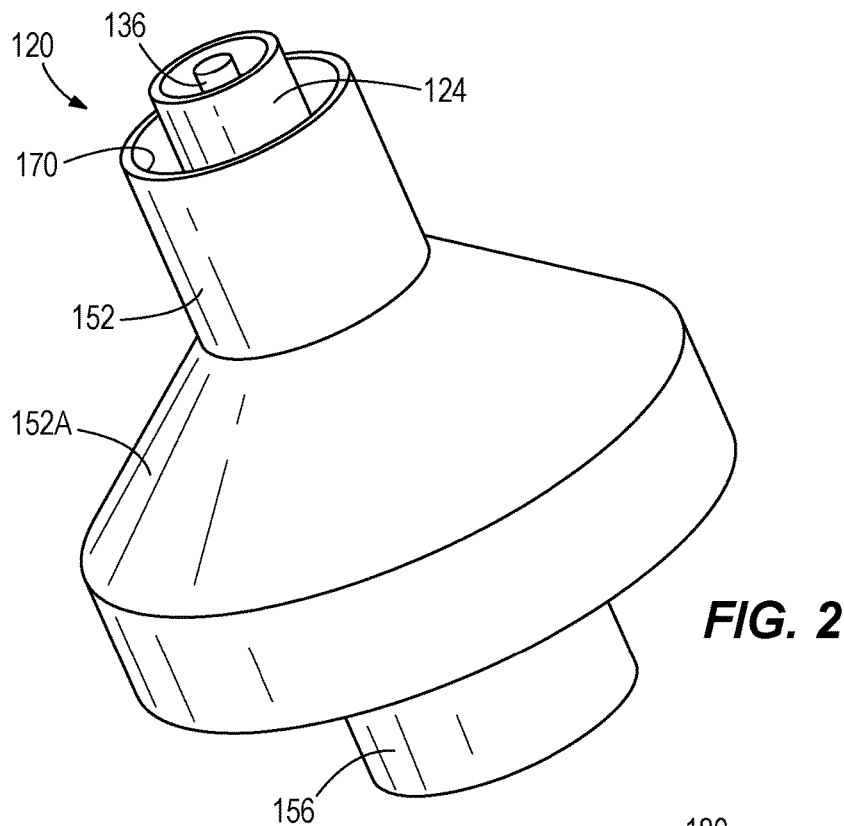
FIG. 2 is a first perspective view of a grain cleaner according to one embodiment of the present disclosure.

A combine harvester 100 (or simply "combine") is shown in FIG. 1. The combine 100 includes a head or grain platform 104 operable to cut or pick up pre-cut crops and feed the crops into a housing 108 of the combine 100. Within the housing 108, the crops are threshed and stalk material or "straw" is removed or separated, leaving the crop grains that are to be collected and chaff which is to be removed in a cleaning operation so that cleaned grain can be discharged from the combine 100. The threshing and separating can be accomplished by any one of a variety of practical mechanisms, and the crop material other than the bulk of crop stalks is fed into the grain cleaner 120. In the illustrated embodiment, the grain cleaner 120 is positioned within the housing 108 of the combine 100, but other constructions including standalone constructions separate from a combine are also envisioned.

The grain cleaner 120 includes an inlet chute 124 having a first or inlet end 126 and a second or outlet end 128. As illustrated, the grain cleaner 120 is oriented so that the inlet end 126 is a top end, and the outlet end 128 is a bottom end located closer to the ground. As such, a central axis A of the grain cleaner 120 is oriented vertically. The arrow G indicates the direction of Earth's gravity. A rotatable crop distribution member 132 extends at least partially through the inlet chute 124, having a rod portion 136 and a distribution head, in particular a distribution disc 140. The distribution disc 140 is positioned adjacent the outlet end 128, having at least a portion spaced below the outlet end 128. The distribution disc 140 includes a plurality of vanes 144, which may also be referred to as paddles or throwers. Optionally, an auger 148 can be positioned within the inlet chute 124 and operable to rotate to advance crop material through the chute 124 from the inlet end 126 toward the outlet end 128 and the distribution disc 140. In some constructions, the auger 148 can be secured to the rod portion 136. The distribution member 132, including the distribution disc 140, is rotatable about the central axis A. The distribution member 132 can be rotated by any suitable means, including a belt drive from an internal combustion engine, or an electric motor, as non-limiting examples. As will be described in further detail below, rotation of the distribution member 132 about the axis A allows the distribution disc 140 to impart a horizontal trajectory, having a radially outward component, to the crop material for cleaning by a transverse air blast. The inlet chute 124 and the distribution member 132 can extend axially at least partially into an outer housing or shell 152 of the grain cleaner 120.

Figure 4:
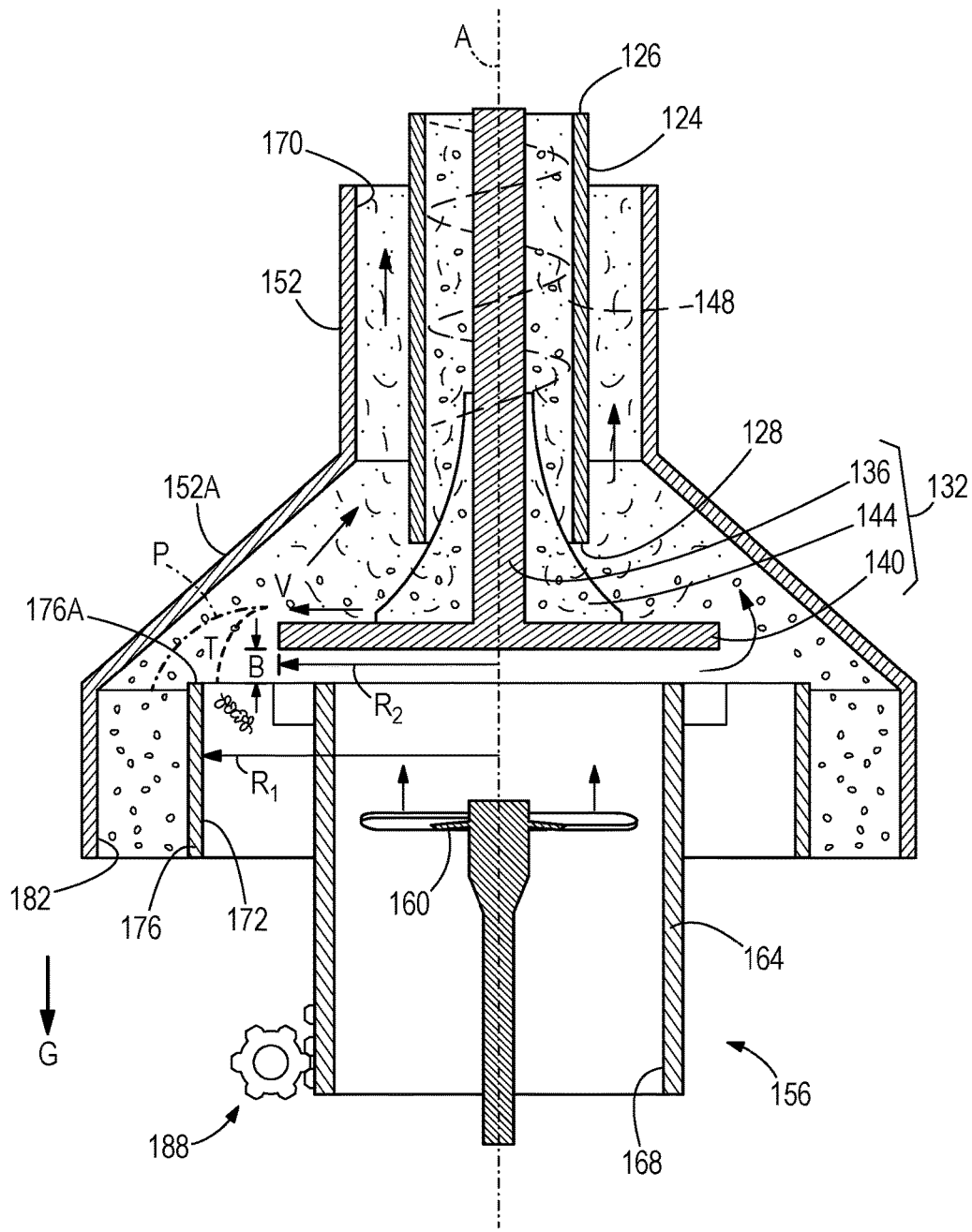
FIG. 4 is a cross-section view of the grain cleaner, taken along line 4-4 of FIG. 3.
Figure 5:
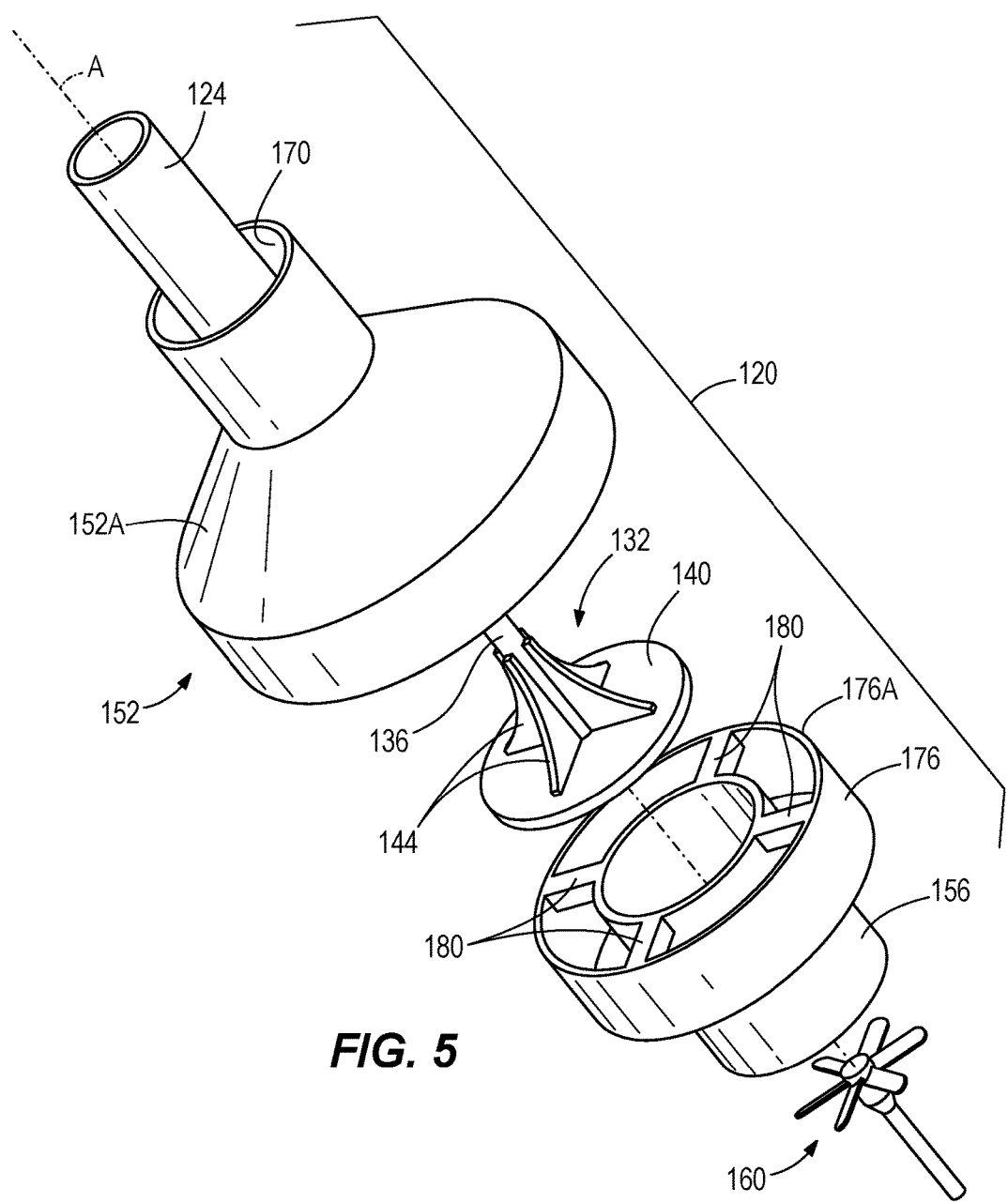
FIG. 5 is an exploded assembly view of the grain cleaner of FIGS. 2-4.

The outer shell 152 of the grain cleaner 120 can also extend radially outside of and at least partially surround a fan unit 156. The fan unit 156 is positioned below the inlet chute 124 and the distribution disc 140. The fan unit 156 includes at least one fan 160 operable to generate an air flow or air stream through the grain cleaner 120 (e.g., an axial fan operable to generate an axial air flow when rotated about the axis A). The fan 160 is spaced axially away from the distribution disc 140 to introduce a space or gap therebetween. The fan 160 is positioned within a shroud 164 defining an air supply channel 168. In other constructions, the fan 160 may be remotely located and provided in fluid communication with the air supply channel 168. As shown, the air supply channel 168 extends along the central axis A and directs the air flow generated by the fan 160 in an upward axial direction toward the distribution disc 140. The air supply channel 168 can be positioned directly below the crop distribution member 132 as shown in FIG. 4. An air-chaff outlet 170 is provided at an upper end of the grain cleaner 120 between the outer shell 152 and the inlet chute 124. Thus, the air-chaff outlet 170 can be provided in an annular ring shape. The fan 160 can be a variable speed fan adjustable to operate at a plurality of different speeds to vary the resulting air flow between a plurality of different air flow rates and vary between a plurality of different air flow velocities. The fan speed may be adjusted to ensure that the air flow through the grain cleaner 120 is laminar, and adjustment to the fan speed can also adjust the grain cleaning performance or efficiency. Fan speed can be adjusted independent of a rotation speed of the crop distribution member 132, which controls the trajectory of the crop material toward multiple possible collection points as is discussed in further detail below.

Figure 3:
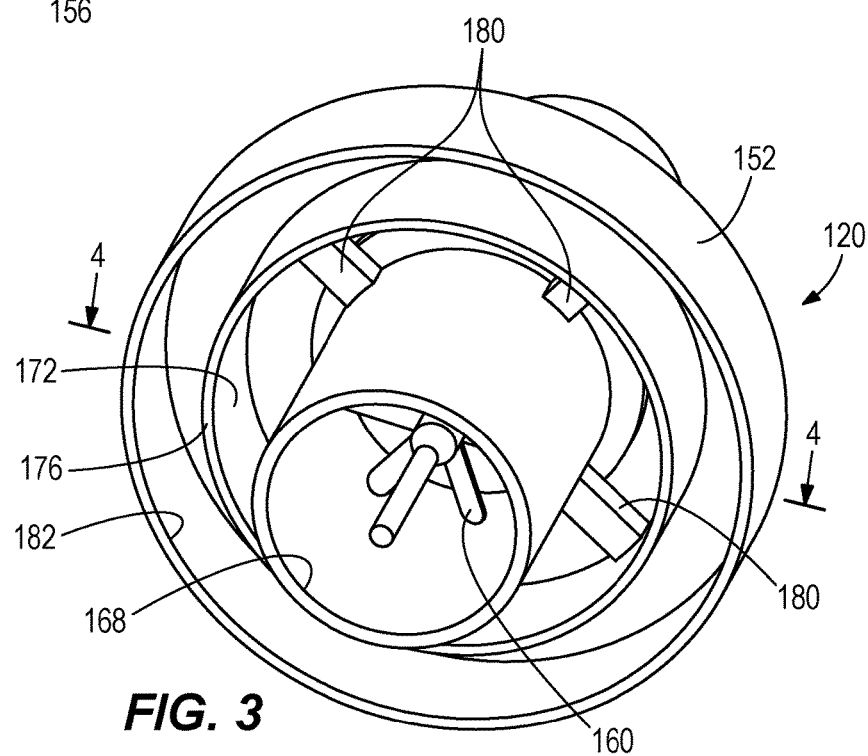
FIG. 3 is a second perspective view of the grain cleaner of FIG. 2.

With reference to FIGS. 3 and 4, a first or radially inner collection channel 172 is formed by the radially outer side of the shroud 164 along with a wall 176 spaced radially outside of the shroud 164. Thus, the first collection channel 172 is formed in an annular ring shape. The first collection channel 172 can be coupled to a tailings collection chamber below. However, tailings (e.g., including crop heads that are not fully threshed to fully separate all the grain from the chaff) may be re-routed back to a threshing device that discharges into the inlet chute 124. The wall 176 can be fixedly secured to the shroud 164 (e.g., with one or more supports 180) so as to be integrated with the fan unit 156. In some constructions, the wall 176 is adjustable axially along the shroud 164 and can be fixed in one of a plurality of relative axial positions with respect to the shroud 164. Further, in other constructions, the wall 176 is not supported by the shroud 164, but instead coupled in a fixed or adjustable relationship with the outer shell 152 or yet another adjacent structure such as a support member secured to the housing 108 or a frame of the combine 100. The wall 176 defines a top edge 176A that is spaced axially below the distribution disc 140 by a spacing distance B (FIG. 4). In the illustrated example where the top edge 176A extends to the same height as the fan shroud 164, the same spacing distance B is provided between the distribution disc 140 and an outlet of the air supply channel 168. The wall 176, and particularly the top edge 176A thereof, can be positioned at a radius $R_1$ from the central axis A, which is greater than a radius $R_2$ defined by the outer periphery of the distribution disc 140.

The grain cleaner 120 further includes a second or radially outer collection channel 182 that is positioned directly radially outside of the first collection channel 172. The second collection channel 182 is coupled to a grain collection chamber below. The second collection channel 182 is formed in the illustrated construction by a radially interior surface of the outer shell 152 and a radially exterior surface of the wall 176. Thus, the second collection channel 182 is formed in an annular ring shape. Between the second collection channel 182 and the air-chaff outlet 170, the outer shell 152 can include a tapered section 152 that tapers down toward the air-chaff outlet 170. In other words, a cross-section of the outer shell 152 transverse to the central axis A reduces over an axial span toward the air-chaff outlet 170. The axial extent of the second annular channel 182 can partially or full overlap with the axial extent of the first annular channel 172. The wall 176 is a common separator wall that separates the first collection channel 172 from the second collection channel 182. In some constructions, the wall 176 is axially adjustable with respect to the crop distribution member 132. One exemplary manner of an adjustment device 188 is shown in FIG. 4 to include a rack gear provided on the shroud 164, which is fixedly secured to the wall 176 by the supports 180, and a pinion gear meshed with the rack gear and rotatable about an axis perpendicular to the central axis A. However, any number of practical adjustment mechanisms may be provided in alternate constructions.

In operation, both the crop distribution member 132 and the fan 160 are separately driven to rotate so that the distribution disc 140 spins at a first speed and the fan 160 spins at a second speed that can be different from the first speed. The fan speed is set to create a laminar air stream from the air supply channel 168, past the outer periphery of the distribution disc 140, and through the channel defined between the outer shell 152 and the inlet chute 124 to the air-chaff outlet 170. Crop material is fed into the inlet chute 124, and the crop material is advanced toward the outlet end 128, and can be advanced by the optional auger 148. When the crop material reaches the distribution disc 140, the rotating paddles 144 assist in throwing or flinging the crop material airborne away from the central axis A by centrifugal force. Thus, the distribution disc 140 imparts an exit velocity V (FIG. 4) as the crop material leaves the periphery of the distribution disc 140. The crop material can be propelled along a trajectory defining a grain cleaning path P (FIG. 4). The beginning of the trajectory where the crop material leaves the periphery of the distribution disc 140 is horizontal, radially or spirally outward. Crop material, whether individual grains or tailings, is expelled airborne away from the central axis A to be exposed to the air stream from the fan 160, which is directed transversely to the paths of tailings and grain to the first and second collection chutes 172, 182, respectively. The first and second collection chutes 172, 182 can be air-locked such that air from the fan 160 does not flow through the collection chutes 172, 182 as there is no outlet for the air below the collection chutes 172, 182. Thus, the air stream picks up and carries crop material such as the dust, chaff, etc. that is lighter than the grain to be collected from the crop material as it travels airborne from the distribution disc 140. This light material is carried by the air stream up and out of the grain cleaner 120 through the air-chaff outlet 170. On the other hand, the combination of crop distribution velocity from the distribution disc 140 and the air stream velocity from the fan 160 is tuned to allow the grain to continue along the cleaning path P, over the top edge 176A of the wall 176 and into the second collection chute 182, or grain collection chute. However, the tailings, which are heavier than the grain to be collected, fall from the cleaning path P before reaching the top edge 176A of the wall 176 as shown by the evenly-dashed line T in FIG. 4. As such, the tailings are collected separately by the first collection chute 172, or tailings collection chute 172. As mentioned above, the tailings can be discarded or recycled for further processing in the combine 100.

Upon observing the output(s) of the grain cleaner 120, an operator or controller can adjust one of a speed that the crop material is projected from the crop distribution member 132 or a speed of the air stream (i.e., fan speed), independent of the other, to adjust the cleaning performance as desired. For example, if grain is landing in the first collection chute 172 at an undesirable rate, the speed of the crop distribution member 132 can be increased, without altering the operation of the fan 160. Likewise, if an unacceptable amount of dust and chaff is passed with the grain into the second collection chute 182, the fan speed can be increased, without altering the operation of the crop distribution member 132.

Thus, the grain cleaner 120 depicted herein is an annular rotary device taking full advantage of the different gravitational effects on the different constituent parts of the crop material by separating grain from tailings based on how far they carry after being propelled from the distribution disc 140, and also cleaning the grain of the chaff and dust by an air stream that is not strong enough to pick up the grain. In order to provide uniform performance at different positions around the central axis A, the grain cleaner 120 should be provided in an upright orientation in which the central axis A is arranged vertically. Alternately, a modified construction of the grain cleaner 120 may not be of annular construction, and may for example, utilize a crop distribution member to propel the crop material linearly, transverse to an air stream, toward first and second collection chutes. Such a construction may enable a wider range of useful orientations for the grain cleaner. However, such a grain cleaner may still be provided such that the crop distribution member projects the crop material in an airborne trajectory that is at least predominantly horizontal (i.e., less than 45 degrees from horizontal, and optionally less than 20 degrees or less than 10 degrees from horizontal).

Various features and advantages are set forth in the following claims.

What is claimed is:

1. An agricultural grain cleaner comprising:
   an inlet chute having an inlet end and an outlet end positioned below the inlet end;
   a crop distribution member positioned adjacent the outlet end of the inlet chute, the crop distribution member including a distribution disc rotatable relative to the inlet chute about a vertical central axis to impart a horizontal trajectory, away from the central axis, to crop material supplied to the distribution disc from the inlet chute;
   a fan operable to generate an air stream from below the crop distribution member, across the horizontal trajectory, to an air-chaff outlet;
   a grain collection chute having an inlet to receive grain that is cleaned of chaff by the air stream; and
   a tailings collection chute positioned adjacent to the grain collection chute on a radially inner side thereof,
   wherein the fan is adjustable to operate at a plurality of different speeds, independent of a rotation speed of the crop distribution member.

2. An agricultural grain cleaner comprising:
   an inlet chute having an inlet end and an outlet end positioned below the inlet end;
   a crop distribution member positioned adjacent the outlet end of the inlet chute, the crop distribution member including a distribution disc rotatable relative to the inlet chute about a vertical central axis to impart a horizontal trajectory, away from the central axis, to crop material supplied to the distribution disc from the inlet chute;
   a fan operable to generate an air stream from below the crop distribution member, across the horizontal trajectory, to an air-chaff outlet;
   a grain collection chute having an inlet to receive grain that is cleaned of chaff by the air stream; and
   a tailings collection chute positioned adjacent to the grain collection chute on a radially inner side thereof, wherein a radially inner wall of the grain collection chute and a radially outer wall of the tailings collection chute are formed by a common separator wall.

3. The agricultural grain cleaner of claim 2, wherein the common separator wall is axially adjustable with respect to the crop distribution member.

4. The agricultural grain cleaner of claim 2, wherein the common separator wall is fixedly secured to a shroud defining an air supply channel in which the fan is positioned.

5. The agricultural grain cleaner of claim 1, wherein the fan is arranged to rotate about the central axis so that the air stream generated is an axial air stream directed at an end of the distribution disc.

6. The agricultural grain cleaner of claim 1, wherein a radially outer wall of the grain collection chute is formed by an outer shell of the grain cleaner.

7. The agricultural grain cleaner of claim 6, wherein the outer shell has a tapered section that reduces in diameter toward the air-chaff outlet.

8. The agricultural grain cleaner of claim 1, further comprising an auger operable within the inlet chute to carry the crop material toward the outlet end of the inlet chute.

9. An agricultural grain cleaner comprising:
   an inlet chute having an inlet end and an outlet end;
   a crop distribution member including a distribution disc positioned adjacent the outlet end of the inlet chute to receive crop material supplied through the inlet chute, the crop distribution member being rotatable about a central axis to propel the crop material airborne along a cleaning path in a direction away from the central axis;
   an air supply channel extending to direct an air stream toward the distribution disc and across the cleaning path;
   a grain collection chute having an inlet to receive grain that is cleaned of chaff by the air stream as it traverses the cleaning path;
   a tailings collection chute having an inlet positioned nearer the central axis than the inlet of the grain collection chute so that the tailings collection chute receives tailings that fall from the cleaning path; and
   a fan operable to generate the air stream, wherein the fan is adjustable to operate at a plurality of different speeds, independent of a rotation speed of the crop distribution member.

10. The agricultural grain cleaner of claim 9, wherein the air supply channel extends in an axial direction and is positioned along the central axis directly under the crop distribution member.

11. The agricultural grain cleaner of claim 9, wherein the distribution disc includes a plurality of distribution paddles operable to propel the crop material along the cleaning path.

12. An agricultural grain cleaner comprising:
    an inlet chute having an inlet end and an outlet end;
    a crop distribution member including a distribution disc positioned adjacent the outlet end of the inlet chute to receive crop material supplied through the inlet chute, the crop distribution member being rotatable about a central axis to propel the crop material airborne along a cleaning path in a direction away from the central axis;

an air supply channel extending to direct an air stream toward the distribution disc and across the cleaning path;

a grain collection chute having an inlet to receive grain that is cleaned of chaff by the air stream as it traverses the cleaning path; and a tailings collection chute having an inlet positioned nearer the central axis than the inlet of the grain collection chute so that the tailings collection chute receives tailings that fall from the cleaning path, wherein a radially inner wall of the grain collection chute and a radially outer wall of the tailings collection chute are formed by a common separator wall.

13. The agricultural grain cleaner of claim 12, wherein the common separator wall is axially adjustable with respect to the crop distribution member.

14. The agricultural grain cleaner of claim 12, wherein the common separator wall is fixedly secured to the air supply channel.

15. The agricultural grain cleaner of claim 9, wherein a radially outer wall of the grain collection chute is formed by an outer shell of the grain cleaner, and the outer shell has a tapered section that reduces in diameter toward an air-chaff outlet.

16. The agricultural grain cleaner of claim 9, further comprising an auger operable within the inlet chute to carry the crop material toward the outlet end of the inlet chute.

17. A method of cleaning threshed grain in a grain cleaning device, the method comprising:

directing threshed crop material, including grain and chaff, to a crop distribution member;

projecting the crop material with the crop distribution member in an airborne trajectory along a cleaning path, wherein the crop distribution member projects the crop material at least predominantly horizontally;

providing an air stream transverse to the cleaning path;

arranging a grain collection chute to be horizontally spaced from the crop distribution member so that the grain projected from the crop distribution member lands in the grain collection chute, while the chaff is blown away from the grain trajectory so that the grain is cleaned of the chaff without sifting or sieving; and adjusting one of a speed that the crop material is projected from the crop distribution member or a speed of the air stream, independent of the other, to adjust grain cleaning performance.

18. The method of claim 17, further comprising arranging a tailings collection chute between the crop distribution member and the grain collection chute so that tailings having mass greater than the grain fall down from the cleaning path and into the tailings collection chute before reaching the grain collection chute.

* * * * *